United States Patent [19]

Nishimura et al.

[11] Patent Number: 4,482,009
[45] Date of Patent: Nov. 13, 1984

[54] AUTOMOBILE AIR CONDITIONING SYSTEM

[75] Inventors: Masao Nishimura, Anjo; Masami Mori, Oobu; Yasuhito Kai, Kariya, all of Japan

[73] Assignee: Nippondenso Co., Ltd., Kariya, Japan

[21] Appl. No.: 367,061

[22] Filed: Apr. 9, 1982

[30] Foreign Application Priority Data

Apr. 10, 1981 [JP] Japan ................... 56-54506

[51] Int. Cl.³ ............... F24F 7/00; F24F 3/044; F28F 9/22
[52] U.S. Cl. ................. 165/41; 62/244; 98/2.01; 165/16; 165/22; 165/25; 165/43; 165/100; 165/101; 165/139; 237/12.3 B
[58] Field of Search .......... 165/22, 42, 43, 41, 165/24, 25, 101, 139, 100, 16; 98/2.01, 2.05, 2.06, 2.07; 62/244; 236/13, 91 D; 237/12.3 A, 12.3 B, 12.3 C

[56] References Cited

U.S. PATENT DOCUMENTS

| | | | |
|---|---|---|---|
| 2,860,567 | 11/1958 | Wilfert | 98/2.06 |
| 3,004,752 | 10/1961 | Armes et al. | 165/42 X |
| 3,788,386 | 1/1974 | Demaray | 165/22 X |
| 3,807,490 | 4/1974 | Engel | 165/42 X |
| 3,934,642 | 1/1976 | Coulson et al. | 165/42 X |
| 4,205,381 | 5/1980 | Games et al. | 165/22 X |
| 4,289,195 | 9/1981 | Bellot et al. | 165/42 X |
| 4,364,513 | 12/1982 | Tsuzuki et al. | 98/2.01 X |
| 4,375,754 | 3/1983 | Okura | 165/43 X |
| 4,426,852 | 1/1984 | Nishimura et al. | 165/43 X |
| 4,434,932 | 3/1984 | Hara et al. | 98/2.01 |

FOREIGN PATENT DOCUMENTS

| | | | |
|---|---|---|---|
| 1580983 | 12/1970 | Fed. Rep. of Germany | 165/42 |
| 52-52008 | 4/1977 | Japan | 165/101 |
| 56-82622 | 7/1981 | Japan | 165/43 |
| 22875 | of 1913 | United Kingdom | 165/101 |

*Primary Examiner*—Sheldon J. Richter
*Attorney, Agent, or Firm*—Cushman, Darby & Cushman

[57] ABSTRACT

An automobile air-conditioning system in which a single ventilation unit for supplying the conditioned air to a compartment is divided into two parts, and the air passing through each part is adapted to be controlled respectively. The compartment is divided into at least three air-conditioning zones of the front right, front left and rear seat zones so that a plurality of air outlets may supply air to the respective air-conditioning zones. The air respectively temperature-controlled is selectively supplied to each of the air outlets.

7 Claims, 7 Drawing Figures

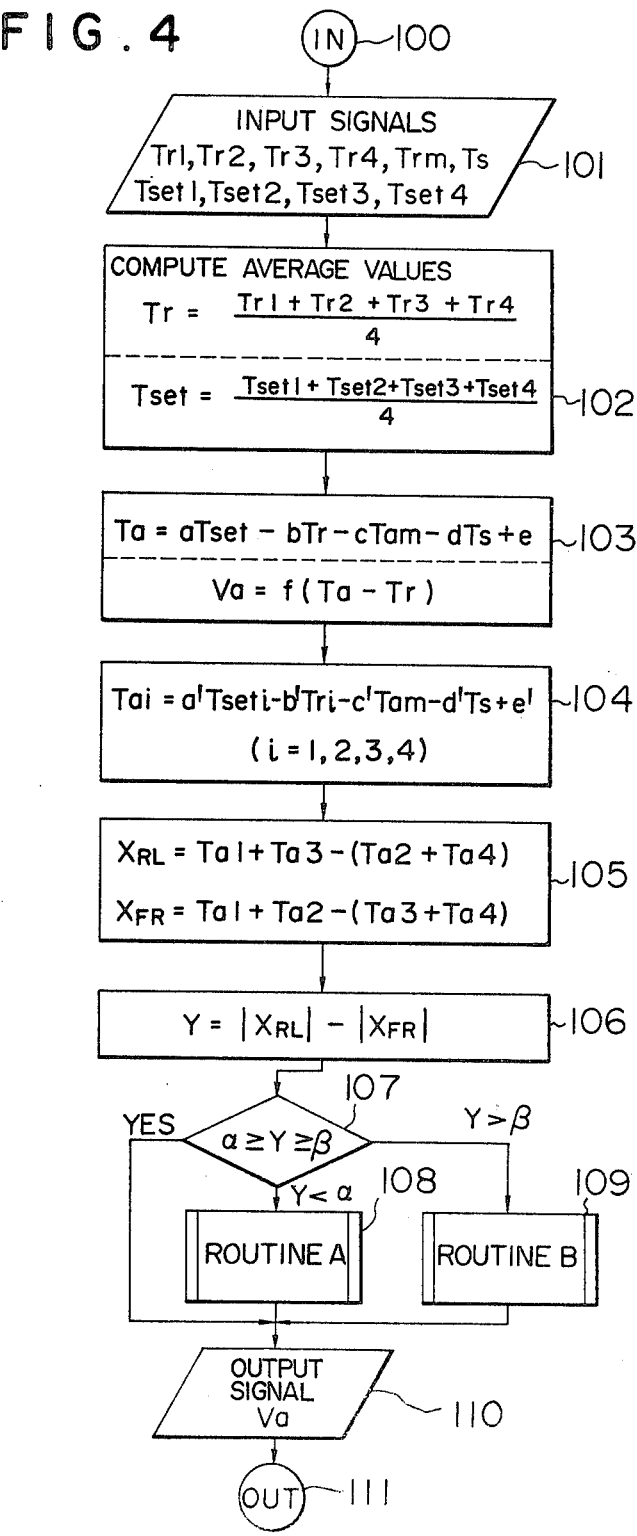

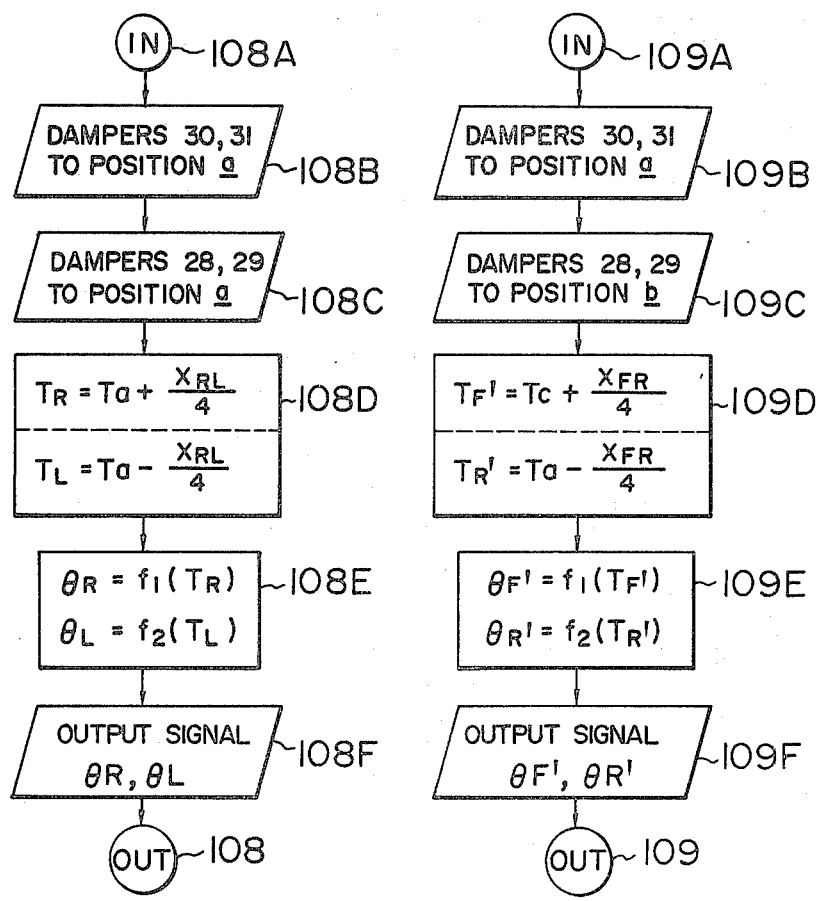

AUTOMOBILE AIR CONDITIONING SYSTEM

BACKGROUND OF THE INVENTION

The present invention relates to an automobile air conditioning system having the function of temperature control of the air in the automobile compartment.

In automobiles including the passenger car having a small riding space or compartment, the value of the comfortable temperature required around each seat (air-conditioning zone) or the actual temperature is known to be greatly different depending on the propensity of the passengers (including the driver) or the effect of sunlight. Systems have so far been proposed for changing the air-conditioning effect on each seat independently or making effects uneven the effect on one seat from the effect on another.

One of the simplest examples of such a system comprises an air-conditioning unit, a plurality of air outlets facing respective sections of the compartment, ventilation ducts for conducting the air conditioned in the air-conditioning unit to the air outlets, and a distribution valves arranged in the ventilation ducts for making the distribution of the air uneven to the respective sections of the compartment from the air outlets. Although the magnitude of the air flow rate at each section of the compartment causes the difference of temperature of the respective sections, the air-conditioning feeling of the passengers including driver also depends on the air flow rate, and therefore it is not desirable to make the air flow rate uneven to a large measure. It is thus difficult to attain a uniform temperature of the respective sections or a sufficiently large temperature difference among the sections. This is also the case when an electrically-operated air blower instead of the distribution valve is provided at each air outlet so that the air conduction ability of the blower is adjusted appropriately or when a blowing direction adjusting fin is provided at each air outlet so that the angle of the fin is changed. In both cases, it is difficult to control the temperature satisfactorily without adversely affecting the air conditioning feeling of the passengers.

In other known methods, instead of changing the distribution of the air flow rate, a temperature control unit is provided for each section of the compartment. The most well known example is what is called a dual air-conditioning system comprising a main air conditioning unit arranged on the front part of the compartment for air-conditioning the front seat section mainly and a rear air-conditioning unit arranged at the rear part of the compartment for air-conditioning the rear seat section of the compartment mainly. In the case where three or more sections of the compartment are to be temperature-controlled independently such as when the front or rear seat section is subdivided into right and left seat sections, the aforementioned method of changing the air flow rate is required to be used at the same time, thus making a satisfactory temperature control impossible.

Still another example such as disclosed in Japanese Patent Laid-Open Publication No. 2213/81 suggests a method in which the compartment is divided into a plurality of air-conditioning zones corresponding to seats and each air-conditioning zone is provided with an independent air outlet and an independent temperature control system. In this method, the temperature of the air blown out to each air-conditioning zone from a corresponding air outlet is controlled to a desired value more easily than in the aforementioned methods by regulating the temperature control system for each air-conditioning zone. An ordinary passenger car is generally capable of accommodating about four passengers and therefore is required to be divided into four air-conditioning zones. This requires the air-conditioning unit to be provided with four temperature control systems as many as the air-conditioning zones, thereby structurally complicating and unduly increasing the size of the temperature control systems and the dusts. Further, an air duct is required for each temperature control system leading to each air outlet, resulting in an increased ventilation resistance.

SUMMARY OF THE INVENTION

In view of the above-mentioned problems, the primary object of the present invention is to provide an efficient automobile air-conditioning system with a simple construction in which the compartment is considered to comprise a plurality of horizontal air-conditioning zones corresponding to the seats and the temperature control is capable of being effected as desired for each air-conditioning zone.

The present invention is based on the recognition that the factors determining the comfortable temperature required for each air-conditioning zone include not only the propensity of the passengers but also the structural features of the automobile compartment. Taking a four-passenger car as an example, the compartment is divided into the front seat section and the rear seat section, each section being subdivided into right and left seat sections. The sunlight radiated into the compartment from the front, rear and side parts of the car have different thermal effects on the four air-conditioning zones of the compartment corresponding to the seats, or cause different direct feelings of heat to the passengers in the respective air-conditioning zones. Especially, such a thermal effect or heat feeling is often different between the front seat air-conditioning zone and the rear seat air-conditioning zone or between the right and left seat air-conditioning zones of the front or rear seat section.

After the driver in the front seat, the next passenger will naturally take the seat adjacent to the driver or on the back of the driver, thereby causing the difference of the air temperatures desired by the driver and the other passenger.

The basic principle of the present invention is based on the above-mentioned facts and the feature thereof is that air of different temperature is capable of being supplied selectively to the front seat air conditioning zone and the rear seat air conditioning zone or selectively to the right and left seat air-conditioning zones of the front or rear seat section.

For this purpose, the system according to the present invention comprises a pair of temperature control systems contained in a ventilation unit for supplying the conditioned air into the compartment, each temperature control system including a heat exchanger for heating and a means for adjusting the heat exchange amount thereof. Two types of air of different temperatures generated by the two temperature control systems are selectively supplied to at least three air-conditioning zones including the front right seat section, the front left seat section and the rear seat section by selector means for selectively connecting the plurality of air outlets facing the respective air-conditioning zones with the first and second temperature control systems. In this way, the first and second temperature control systems are adapted to supply air of different temperatures to the right and left air-conditioning zones of the front seat section or to the two air-conditioning zones of the front and rear seat sections.

The present invention is suitable for air-conditioning a typical four-passenger car, in which the compartment is divided into four air-conditioning zones including the front right front left rear right and rear left seat sections so that air of different temperatures is supplied to the two air-conditioning zones of the front and rear seat sections or to the two air-conditioning zones of the right seats and left seats.

According to a preferred embodiment of the present invention, air is supplied to each of the four air-conditioning zones of the compartment from an air-conditioning unit through the first to fourth air passages, the first air passage being connected only with the first temperature control system, the fourth air passage being connected only with the second temperature control system, and the second and third air passages may be connected with the first and second temperature control systems in complementary manner with each other by switching means such as a distribution valve.

According to the preferred embodiment of the present invention, any preselected two or three out of the four air-conditioning zones may be supplied with air in concentrated manner. In this case, the two air-conditioning zones involved or one and the other two air-conditioning zones, as the case may be, are adapted to be supplied with air of different temperatures from each other.

Another object of the present invention is to provide an automatic control system in which the temperature difference between the front and rear seat sections of the four air-conditioning zones and the temperature difference between the right and left seat zones, are detected, so that the first and second temperature control systems and the selector means are electrically controlled to reduce the temperature differences almost at the same time.

According to the present invention, the temperature of each of a plurality of horizontal air-conditioning zones in the compartment of an automobile is controlled with an air-conditioning unit of simple construction, and the temperature difference control of the front and rear seat sections and that of the left and right seats can be made resepctively as desired, thus satisfying the air-conditioning feeling of a plurality of passengers.

BRIEF DESCRIPTION OF THE DRAWINGS

FIG. 4 is a flowchart for explaining the control operation of a digital computer in FIG. 3.

FIG. 5 shows a characteristic diagram for explaining the control operation of a blow fan by the digital computer 50.

FIGS. 6 and 7 are diagrams for showing in detail temperature control program routines in FIG. 4.

DESCRIPTION OF THE PREFERRED EMBODIMENTS

Figure 1:
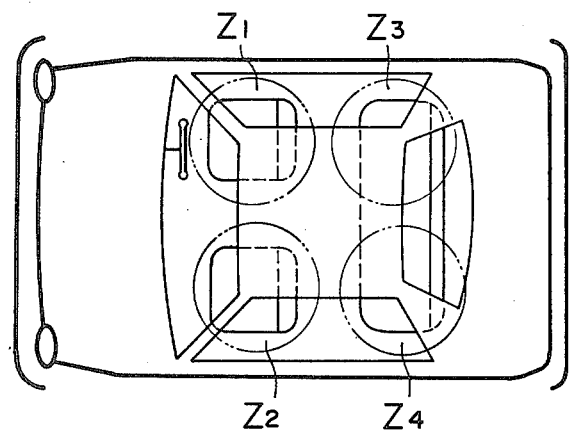
FIG. 1 is a diagram showing an arrangement of the air-conditioning zones for explaining the present invention.

The present invention will be described below with reference to the embodiments shown in the drawings. FIG. 1 shows an arrangement of air-conditioning zones in a typical four-passenger car, in which the front right seat section is defined as the first air-conditioning zone Z1, the front left seat section is defined as the second air-conditioning zone Z2, the rear right section as the third air-conditioning zone Z3, and the rear left seat section as the fourth air-conditioning zone Z4.

Figure 2:
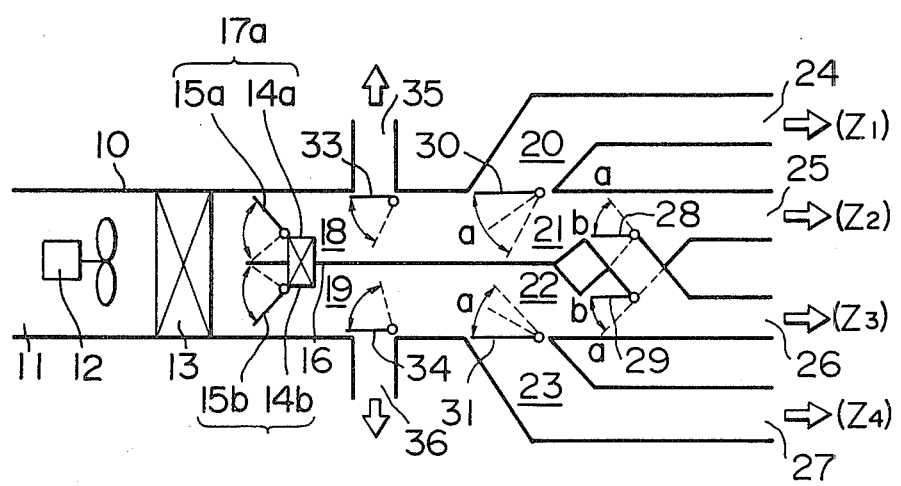
FIG. 2 shows a construction of an air-conditioning unit according to an embodiment of the present invention.

A construction of the automobile air-conditioning system according to the present invention is shown in FIG. 2. Reference numeral 10 designates a ventilation unit of the air-conditioning system which ventilation unit is finally integrally mounted thereon. This ventilation unit includes an air inlet port, ventilation section, an air temperature control section and an air distribution section to the compartment integrally constructed with each other. The most upstream portion 11 of the ventilation unit 10 is connected to a well-known inner-outer air selection box not shown for selecting either the introduction of the air from outside the car or circulation of the inner air by manual operation of a passenger.

The ventilation unit 10 comprises electrically-operated blow fan 12 for supplying air, which blow fan 12 is connected electrically to a well-known current switching circuit not shown thereby to enable the passenger to adjust the air flow rate toward the compartment in the unit 10 by manual operation. The air temperature control section for controlling the temperature of this air includes an evaporator 13 making up a cooling heat exchanger, water heaters 14a and 14b making up a heat exchanger for heating (heater), and two temperature control dampers 15a and 15b. The evaporator 13 is used as an element of a freezing cycle of a well-known refrigerant circulation type driven by a car-mounted engine, so that the air introduced into the ventilation unit is cooled by this element.

The water heaters 14a and 14b are provided in the route of the pipe for circulating the cooling water for the car-mounted engine by a water pump and used for reheating the air cooled by the evaporator 13. The water heaters 14a and 14b comprise a heater core integrally fabricated and divided at the center thereof for heating two independent units. Specifically, the temperature control system is divided into apparently combined but substantially independent first and second temperature control units 17a and 17b by a partition plate 16 provided from the downstream portion of the evaporator 13 to divide the ventilation unit.

The first and second temperature control units 17a and 17b include temperature control dampers 15a and 15b respectively as mentioned above. The temperature control dampers 15a and 15b are connected to an operating lever in the compartment through an appropriate link mechanism respectively and are adjustable to a desired position by the manual operation of the passenger. In air mix chambers 18 and 19 communicating with the first and second temperature control units 17a and 17b of the ventilation unit 10, the air temperature is determined by the positions of the temperature control dampers 15a and 15b.

In the ventilation unit 10, the first and second temperature control units 17a and 17b communicate with four air passages 20, 21, 22 and 23 through the air mix chambers 18 and 19 respectively and further through the air passages 20, 21, 22 and 23, communicate with air outlets 24, 25, 26 and 27 facing the compartment. The air outlets 24, 25, 26 and 27 are arranged to face the four air conditioning zones Z1, Z2, Z3 and Z4 shown in FIG. 1 respectively.

The first air passage 20 communicating with the first temperature control unit 17a is connected through the first air outlet 24 to the first air conditioning zone Z1. The fourth air passage 23 communicating with the second temperature control unit 17b, on the other hand, is connected through the fourth air outlet 27 to the fourth air conditioning zone Z4. The second air passage 21 and the third air passage 22 which also communicate with the first temperature control unit 17a and the second temperature control unit 17b respectively are adapted to be selectively connected to the second air outlet 25 and the third air outlet 26 by two distribution valves 28 and 29 making up a selection means. Specifically, the first temperature control unit 17a controls the temperature of the first air conditioning zone Z1 on the one hand and is also capable of controlling the temperature of the second air conditioning zone Z2 or the third air conditioning zone Z3 according to the position of the distribution valve 28 on the other hand. In similar fashion, the second temperature control unit 17b controls not only the temperature of the fourth air conditioning zone Z4 but also the temperature of the second air conditioning zone Z2 or the third air conditioning zone Z3 by the position of the distribution valve 29.

The distribution valves 28 and 29 are connected through an appropriate link mechanism not shown to the operating lever in the compartment so that the driver or passenger may select the position a or b in the drawing separately.

In addition to the distribution valves 28 and 29 for selectively connecting the two temperature control units 17a and 17b to the second and third air conditioning zones Z1 and Z2, a distribution valve 30 making up another switching means is arranged at the junction point of the first and second air passages 20 and 21 connected to the first temperature control unit 17a. This distribution valve 30 connects selectively one of the first passage 20 and the second passage 21 to the first air mix chamber 18 or both the air passages 20 and 21 to the first air mix chamber 18 at the shown position of a. Also, a distribution valve 31 is arranged at the junction of the third and fourth air passages 22 and 23 connecting to the second temperature control unit 17b, and this distribution valve 31 connects selectively one of the third and fourth air passages 22 and 23 to the second air mix chamber 19 or both the air passages 22 and 23 to the second air mix chamber 19 at the shown position of a.

Each of these two distribution valves 30 and 31 is connected to an operating lever in the compartment through an appropriate link mechanism not shown, so that any of the three positions shown by solid line and dashed lines in the drawing may be selected by manual operation of the passenger.

The first to fourth air outlets 24 to 27 facing the air conditioning zones Z1 to Z4 are provided with appropriate distributors for changing the position of air supply to the passengers seated in the seats involved, thereby permitting what is called the vent blow and heater blow. Such a distributor is well known and will not be described herein.

As to a defroster, air passages 35 and 36 communicating with defroster air outlets are connected to the sides of the two air mix chambers 18 and 19 and are adapted to be opened or closed by the distribution valves 33 and 34 interlocked therewith respectively. The distribution valves 33 and 34 are connected with an operating lever in the compartment through appropriate link mechanisms respectively not shown so that the passenger may select the supply of defroster air by manual operation. Assuming that the distribution valves 33 and 34 are positioned at the dashed lines in the drawing, for instance, the air passing through the temperature control units 17a and 17b is blown toward the front windbreak glass from the defroster air passages 35 and 36 instead of being directed toward the first to fourth air passages 20 to 23.

The general function of the automobile air conditioning system having the above-mentioned construction will be explained below.

The functions of the blow fan 12, the evaporator 13 and the water heaters 14a and 14b in the ventilation unit 10 are the same as those of the conventional systems. The difference from the prior art systems lies in that the temperature control system is divided into two parts by a partition plate 16 so that first and second temperature control units 17a and 17b are adapted to act independently to control the temperature in the air mix chambers 18 and 19 respectively.

In this system, the defroster air may be obtained by moving the distribution valves 33 and 34 to the dashed lines by manual operation of an operating lever (not shown). The temperature-controlled air is introduced to defroster air outlets through the air passages 35 and 36 respectively.

In the four air-conditioning zones Z1, Z2, Z3 and Z4, any two air conditioning zones may be supplied with air and may be temperature-controlled independently of each other.

First, in the case where air is supplied to the first air conditioning zone Z1 and the second air conditioning zone Z2, the distribution valve 30 is moved to the position of the dashed line for closing the second air passage 21, the distribution valve 31 is moved to the position of the solid line for closing the fourth air passage 23, the distribution valve 29 is moved to the position a of the dashed line communicating with the air passage 21 from the air passage 22, and the distribution valve 28 is moved to the position b of the solid line. In this way, the first air-conditioning zone Z1 is supplied with the air temperature-controlled at the first temperature control unit 17a and the second air-conditioning zone Z2 is supplied with the air temperature-controlled by the second temperature control unit 17b.

For supplying the air to the first air-conditioning zone Z1 and the third air-conditioning zone Z3, the distribution valve 30 is moved to the dashed line position for closing the second air passage 21 and the distribution valve 31 is moved to the solid line position for closing the fourth air passage 23. In this case, the distribution valve 28 may take any of the solid line and dashed line positions but the distribution valve 29 takes the solid line position b not to communicate with the second air passage 21. As result, the first air-conditioning zone Z1 is supplied with the air temperature-controlled by the first temperature control unit 17a and the third air conditioning zone Z3 is supplied with the air temperature-controlled by the second temperature control unit 17b.

In supplying air to the first air-conditioning zone Z1 and the fourth air-conditioning zone Z4, on the other hand, the distribution valve 30 is moved the dashed line position for closing the air passage 21, and the distribution valve 31 is moved to the dashed line position for closing the third air passage 22. In this case, the distribution valves 28 and 29 may take the position of either the solid or dashed line.

In this way, the first air-conditioning zone Z1 is supplied with the air temperature-controlled by the first temperature control unit 17a, and the fourth air-conditioning zone Z4 is supplied with the air temperature-controlled by the second temperature control unit 17b.

In the case of supplying the air to the second air-conditioning zone Z2 and the third air-conditioning zone Z3, the distribution valve 30 is moved to the solid line position for closing the first air passage 20 and the distribution valve 31 is moved to the solid line position for closing the fourth air passage 23. In this case, the distribution valves 28 and 29 may take any positions as far as both take similar positions of solid or dashed lines. If both the distribution valves 28 and 29 take the solid line positions b, for instance, the second air-conditioning zone Z2 is supplied with the air temperature-controlled by the first temperature control unit 17a, and the third air-conditioning zone Z3 is supplied with the air temperature-controlled by the second temperature control unit 17b.

Now, in the case of supplying air to the second air-conditioning zone Z2 and the fourth air-conditioning zone Z4, the distribution valve 30 is moved to the solid line position for closing the first air passage 20 and the distribution valve 31 is moved to the dashed line position for closing the third air passage 22. In this case, the distribution valve 29 may take any of the solid and dashed line positions, but the distribution valve 28 takes the solid line position b so as to shut communication with the third air passage 22. As a result, the second air-conditioning zone Z2 is supplied with the air temperature-controlled by the first temperature control unit 17a, and the fourth air-conditioning zone Z4 is supplied with the air temperature-controlled by the second temperature control unit 17b.

In the case of supplying air to the third air-conditioning zone Z3 and the fourth air-conditioning zone Z4, the distribution valve 30 is moved to the solid line position for closing the first air passage 20, the distribution valve 31 is moved to the dashed line position for closing the third air passage 22, the distribution valve 28 is moved to the dashed line position a for communicating from the second air passage 21 to the third air passage 22, and the distribution valve 29 is moved to the solid line position b. In this way, the second air conditioning zone Z2 is supplied with the air temperature-controlled by the first temperature control unit 17a, the fourth air-conditioning zone Z4 is supplied with the air temperature-controlled by the second temperature control unit 17b.

In this system, by moving one of the distribution valves 30 and 31 to the intermediate position a, it is possible to supply air to any given three of the four air-conditioning zones while at the same time differentiating them in the temperature control ability to some extent. Also, in this system, if the distribution valves 30 and 31 are both moved to the intermediate positions a, air is supplied to all of the four air-conditioning zones while differentiating the front and rear seat sections or right and left seat sections in the temperature control ability. A typical example will be explained below.

Assume that the distribution valves 30 and 31 are both set to the intermediate position a by operation of the operating lever. If the distribution valves 28 and 29 are moved to the solid line positions b, the air temperature-controlled by the first temperature control unit 17a is supplied to the first air-conditioning zone Z1 and the second air-conditioning zone Z2, and the air temperature-controlled by the second temperature control unit 17b is supplied to the third air-conditioning zone Z3 and the fourth air-conditioning zone Z4. As a result, the first air-conditioning zone Z1 and the second air-conditioning zone Z2 mainly covering the front seat section may be temperature-controlled by the first temperature control unit 17a, while the third air-conditioning zone Z3 and the fourth air-conditioning zone Z4 mainly covering the rear seat section are temperature-controlled by the second temperature control unit 17b.

In the case where the distribution valves 28 and 29 are both moved to the dashed line positions a, the air temperature-controlled by the first temperature control unit 17a is supplied to the first air-conditioning zone Z1 and the third air-conditioning zone Z3, while the air temperature-controlled by the second temperature control unit 17b is supplied to the second air-conditioning zone Z2 and the fourth air-conditioning zone Z4. Thus, the combination of the first air-conditioning zone Z1 and the third air-conditioning zone Z3 mainly covering the right seats is temperature-controlled by the first temperature control unit 17a, whereas the combination of the second air-conditioning zone Z2 and the fourth air-conditioning zone Z4 mainly covering the left seats is temperature-controlled by the second temperature control unit 17b.

Generally, it is highly required to supply air of different temperatures to the front seat air-conditioning zones Z1 and Z2 and the rear seat air-conditioning zones Z3 and Z4, or to the right seat air-conditioning zones Z1 and Z3 and the left seat air-conditioning zones Z2 and Z4. According to the present invention, this demand is satisfied by changing the positions of the distribution valves 28 and 29 and thereby selecting the connections between the temperature control units and the air outlets.

In this system, only the air to the first air-conditioning zone Z1 may be stopped by moving the distribution valve 30 to the solid line position for closing the first air passage 20; only the air to the fourth air-conditioning zone Z4 may be stopped by moving the distribution valve 31 to the solid line position for closing the fourth air passage 23; and only the air supply to the first air-conditioning zone Z1 may be stopped by moving the distribution valve 28 to the dashed line position a for closing the second air outlet 25 while at the same time moving the distribution valve 29 to the solid line position b. Alternatively, the distribution valve 30 is moved to the dashed line position for closing the second air passage 21 while at the same time moving the distribution valve 29 to the solid line position b. If the air supply to the third air-conditioning zone Z3 alone is to be stopped, on the other hand, the distribution valve 29 is moved to the dashed line position a for closing the third air outlet 26 while at the same time moving the distribution valve 28 to the solid line position b. As an alternative, the distribution valve 31 is moved to the dashed line position for closing the third air passage 22 while at the same time moving the distribution valve 28 to the solid line position b.

Although the present invention is described above with reference to the four air-conditioning zones, the present invention may be used as a system for supplying air to three air-conditioning zones, the rear seat air-conditioning zones Z3 and Z4 being combined into a single zone. For instance, the distribution valve 31 and the fourth air passage 23 may be removed so that the rear seat air-conditioning zone (right and left seats combined) is supplied with air through the third air passage 22 and the third air outlet 26. In this case, too, the front seat air-conditioning zone and the rear seat air-conditioning zone or the front right seat air-conditioning zone and the front left seat air-conditioning zone may be differentiated in temperature control ability. (In the case of differentiating the temperature control ability of the front right seat air-conditioning zone from that of the front left seat air-conditioning zone, the rear seat air-conditioning zone is supplied with the air of the same temperature as the air supplied to the front left seat air-conditioning zone.)

Also, if distribution valves with one of them capable of being closed or set to an intermediate position are provided at the air inlets of the first and second temperature control units 17a and 17b, the system according to the present invention may control the temperature of only one of the air-conditioning zones.

The above-mentioned temperature control functions may be achieved also by employing the temperature control units 17a and 17b of such a type that the flow rate of the water heaters is changed without using any temperature control damper.

Figure 3:
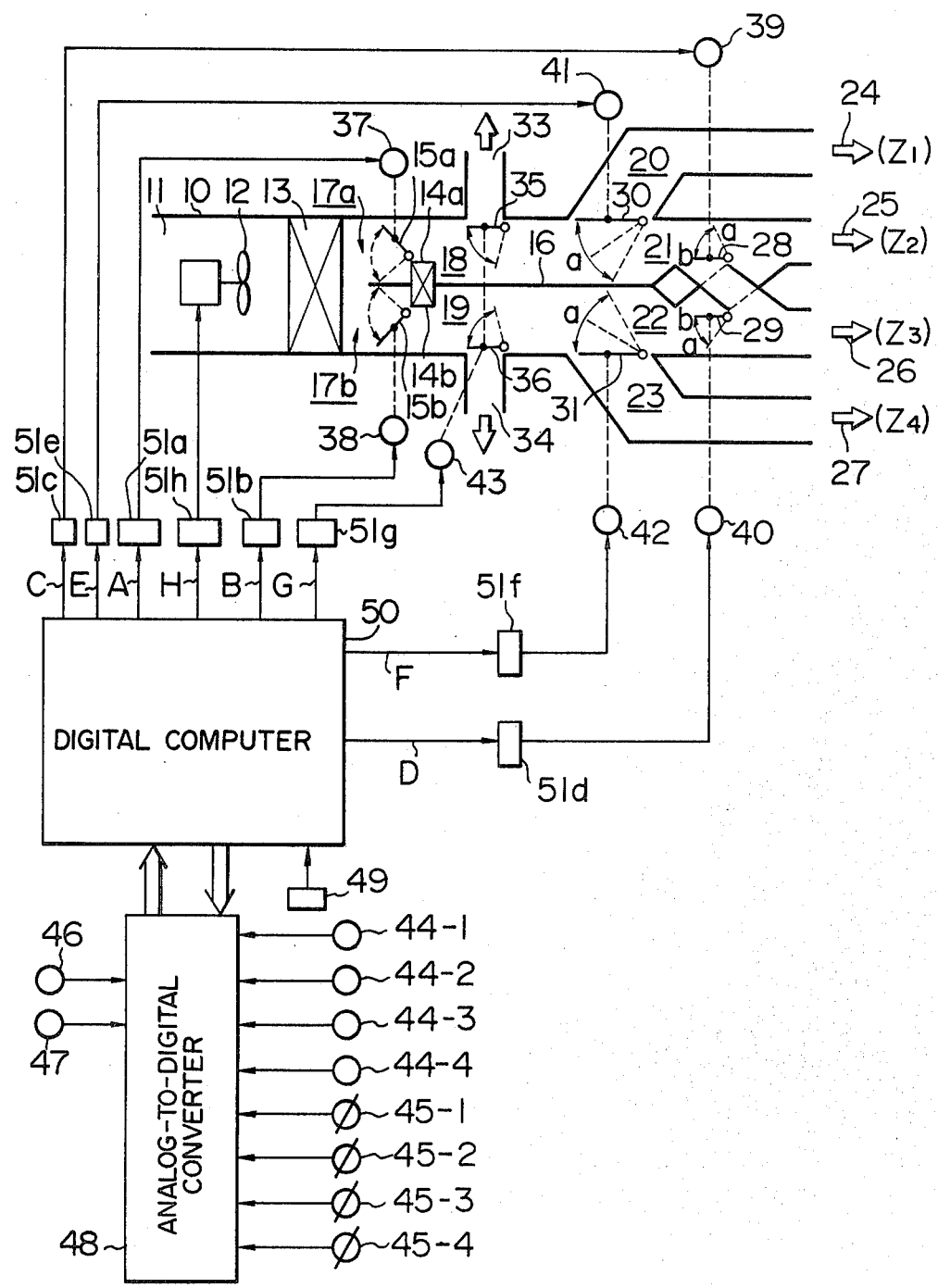
FIG. 3 is a block diagram of a part of an automatic control system according to an embodiment of the present invention.

Now description will be made of another embodiment of the present invention making up an automatic control system. FIG. 3 shows a system for controlling the temperatures of the four air-conditioning zones Z1, Z2, Z3 and Z4, in which the members are arranged in the same manner in the ventilation unit 10 as in the first embodiment of FIG. 2.

The first and second temperature control units 17a and 17b are provided with independently-operated electro-mechanical converters 37 and 38 for changing the positions of the temperature control dampers 15a and 15b automatically by an electrical signal. The electro-mechanical converters 37 and 38 are required to be capable of selecting a desired position and comprises a motive power section such as a servo motor or a negative pressure actuator and a mechanical link mechanism.

Electro-mechanical converters 39 and 40 are provided for moving the two distribution valves 28 and 29 respectively by an electrical signal for connecting the second air passage 21 and the third air passage 22 to each other. The electro-mechanical converters 37 and 38 are of such a type as to be able to select one of the positions a and b of the distribution valves 28 and 29 and comprise a motive power section such as a servo motor or a negative pressure actuator or a mechanical link mechanism.

Electro-mechanical converters 41 and 42 are provided for moving by electrical signals the positions of the distribution valve 30 arranged at the junction point of the first air passage 20 and the second air passage 21 and the distribution valve 31 arranged at the junction point of the third air passage 22 and the fourth air passage 23 respectively. The electro-mechanical converters 41 and 42 are of such a type as to be able to select one of a total of three positions including two positions each for closing an air passage and an intermediate position of the distribution valves 30 and 31 respectively, and comprises a motive power section such as a servo motor or a negative pressure actuator and a mechanical link mechanism.

An electro-mechanical converter 43 is provided for the purpose of changing the positions of the two interlocked distribution valves 35 and 36 by an electrical signal for supplying a defroster. The electro-mechanical converter 43 is of such a type that the distribution valves 35 and 36 may select positions of opening and closing the defroster air passages 33 and 34 and comprises a motor power section such as a servo motor or a negative pressure actuator and a mechanical link mechanism.

Now, explanation will be made of an electric control system for automatically producing a control output signal to the electro-mechanical converters in response to control condition signals. Input elements include temperature sensors 44-1, 44-2, 44-3 and 44-4 provided on the air-conditioning zones for detecting the temperatures of the four air-conditioning zones Z1, Z2, Z3 and Z4 independently of each other. The temperature sensors 44-1 and 44-2 provided for the first air-conditioning zones Z1 and the second air-conditioning zone Z2 respectively are arranged at a place on the dashboard of the car where direct sunlight is hardly applied, while the temperature sensors 44-3 and 44-4 provided for the third air-conditioning zone Z3 and the fourth air-conditioning zone Z4 respectively are arranged at a place on the back of the front seat free of direct sunlight. Each of the temperature sensors is comprised of a heat sensitive resistor element exhibiting a resistance value depending on the ambient temperature, which element is supplied with a predetermined current to produce a signal voltage at a terminal thereof as a detection signal.

Input elements also include temperature setters 45-1, 45-2, 45-3 and 45-4 installed at the air-conditioning zones for setting the temperature of the four air-conditioning zones Z1, Z2, Z3 and Z4 independently of each other. These temperature setters are arranged in the vicinity of the temperature sensors respectively. These temperature setters produce a signal voltage changing according to the will of the passenger and include, for instance, a variable resistor through which a predetermined current is supplied and a signal voltage generated across the resistor is used as a set signal.

In order to detect an external signal affecting the heat load of the compartment, an external temperature detector 46 and a sunlight detector 47 are also provided as input elements. The external temperature detector 46 includes a temperature sensitive resistance element depending on the ambient temperature, and the sunlight detector 47 includes a temperature sensitive resistor element exhibiting a resistance value depending on the ambient temperature. The sunlight detector 47 is disposed at a place in the compartment subjected to direct sunlight such as on the upper surface of the dashboard or rear tray. For increasing the accuracy of the temperature control of each air-conditioning zone, it is desirable to detect the thermal effect of sunlight on each air-conditioning zone separately and directly. According to the embodiment under consideration, the actual temperature of each air-conditioning zone is detected by a temperature sensor thereby to separately respond to the thermal effect of sunlight in spite of a small response delay. The sunlight detector 47 may include a pair of temperature sensitive resistor elements disposed on the dashboard and the rear tray which are connected in series with each other.

The signal voltages generated from the input elements 44, 45, 46 and 47 are digitally processed after being converted into sequential binary codes at the analog-to-digital converter circuit 48. The analog-to-digital converter circuit 48 operates in response to a control signal applied to an external terminal, and includes a multiplexer for selectively gating one of the signals applied to the input terminals from the input elements 44, 45, 46 and 47 and a converter section for converting one of the signal voltages thus gated into a binary code.

A switch panel 49 including a plurality of switching elements is provided as an input element for issuing a command of the operation of the system by the passenger. The switching elements include a first switching element for producing a command signal for actuating the system in automatic mode, a second group of switching elements for producing a command signal designating a position of the distribution valves to the electro-mechanical converters 39, 40, 41, 42 and 43, and a third group of switching elements for producing a command signal for continuing to move the temperature control dampers 15a and 15b in the desired direction (cooling or heating side) for the switch operation time.

In the case where the first switching element is not operated, the operation of the second and third groups of switching elements enables the system to be operated to a desired condition manually as in the manner described with reference to the first embodiment (FIG. 2).

A digital computer 50 is provided for operatively coupling the input elements with the working members in the ventilation unit 10. The digital computer 50 is made up of microcomputer so configured that a control program is sequentially read for each unit command from a read-only memory (ROM) storing preset control programs and the unit command is executed by a central processing unit (CPU). The computer 50 integrally includes an input-output control circuit (I/O) for exchanging the data with an external device, a random access memory (RAM) for temporarily holding the data in the process of processing, and an additional circuit for cordinating the operation and exchanging data between internal elements.

The digital computer 50 receives signals from the input elements sequentially according to a control program and stores the signals provisionally in the random access memory. These temporarily stored data are processed as required so that a signal is produced at the external output terminals specified by the program. After a series of processing cycle, the processing cycle is repeated.

The signals produced at the external terminals of the digital computer 50 represent control output signals of the electro-mechanical converters 37, 38, 39, 40, 41, 42 and 43. The control output signals include a first group of signals A and B for controlling the positions of the first and second temperature control units 17a and 17b, a second group of signals C and D for controlling the positions of the distribution valves 28 and 29 for selecting air passages, and a group of signals E, F and G for controlling the positions of the other distribution valves 30, 31, 35 and 36. The control output signals also include a control signal H for changing the air supply capacity of the air blow fan 12 in accordance with a temperature control command to the first and second temperature control units 17a and 17b.

The output signals A to G produced from the computer 50 are applied to the converters 51a to 51g respectively, from which an electrical drive signal is applied to the electro-mechanical converters. The converters 51c, 51d and 51g associated with the converters 39, 40 and 43 which may simply perform binary operation are comprised of relays for performing a simple switching operation, while the other converters include a D/A converter circuit for converting the control signals A, B, E and F applied as positioning digital signals from the computer 50 into analog signals and a servo amplifier circuit operated in response to the outputs from the converters. The latter converters may include a feedback position sensor for detecting the position of the output rod of the electro-mechanical converters as required.

FIG. 4 show a flow of a control program preset in the digital computer 50 and represents the process of operations of the automatic system. The essential parts of the control program will be explained below with reference symbols.

Upon turning on the main switch, the digital computer 50 starts execution of the control program from the initial address command so that the operating conditions of the switching elements of the switch panel 49 are checked. As a result, if the first switching element for operating the system automatically is operated or the other switching elements for operating the system elements in manual mode are not operated, the control program shown in FIG. 4 is executed from step 100 at regular time intervals.

At signal input step 101, the digital computer 50 stores first the signals received from the input elements in the random access memory. In this stage, the digital computer 50 issues a command for selecting one of the signal voltages of the input elements or a command for converting the particular signal voltage to a digital value (a binary code signal) to the analog-to-digital converter circuit 48 and receives a digital value signal after conversion. The temperature data Tr1, Tr2, Tr3 and Tr4 received from the temperature detectors 44-1 to 44-4 arranged in the respective air-conditioning zones, the set temperature data Tset1, Tset2, Tset3 and Tset4 obtained from the temperature setters 45-1 to 45-4, the external temperature data Tam obtained from the external temperature detector 46 and the sunlight data Ts obtained from the sunlight detector 47 are stored at predetermined asigned addresses of the random access memory. Though not explained in detail, it is desirable to compuete the average value of the latest several ones of the these data for securing the stability of the data.

At the average value computation step 102, an average of the measured temperatures and set temperatures of the air-conditioning zones are computed, so that the average room temperature of the compartment Tr and the average set temperature Tset are stored at predetermined asigned address of the random access memory.

At the control temperature computation step 103, the average temperature Ta of the air supplied from the ventilation unit 10 required for causing the average temperature Tr of the air-conditioning zones of the compartment to approach to the average set temperature Tset of the air-conditioning zones and maintaining the level of temperature Tset is computed from a functional equation based on the constants a, b, c, d and e determined by the construction of the vehicle, the air-conditioning units, etc.

Also, in order to change the air blowing ability of the air blow fan 12 in interlocked relation with the temperature control, the data Va on the voltage applied to the air blowing fan 12 is computed by a functional equation corresponding to the difference between the computed average air blow temperature Ta and the average room temperature Tr. The voltage data V is obtained with reference to a map using a program memory or a predetermined functional equation in accordance with the difference Ta-Tr as illustrated in FIG. 5.

At the step 104, the temperature Tai of the air to be supplied from the first to fourth air outlets 24 to 27 is computed individually in order to obtain the set temperature Tseti (i: 1, 2, 3, 4) for the air-conditioning zones Z1 to Z2. By use of the four data Ta1 to Ta4 on the required temperature of the air to be supplied through the first to fourth air outlets 24 to 27, the step 105 computes the value $X_{FR}$ representing the temperature difference of the supply air to the front and rear seat sections of the compartment and the value $X_{RL}$ representing the temperature difference of the supply air to the right and left seat sections. At steps 106 and 107, the magnitudes of the two values $X_{FR}$ and $X_{RL}$ are compared and if the required air supply temperature difference $X_{RL}$ between the right and left seat sections is larger than the value $X_{FR}$, the routine A108 is executed; while if the temperature difference between front and rear seat sections is smaller, the routine B109 is executed. For the judgement at the step 107, two reference values $\alpha$ and $\beta$, positive and negative ($\alpha+\beta$ is zero or near zero), near zero are employed in order to prevent the hunting in switching the routines A and B.

The routine A is shown in FIG. 6. A control output signal for setting the distribution valves 30 and 31 of the ventilation unit 10 to the intermediate position a is produced to the converters 41 and 42 at the step 108B, and a control output signal for setting the passage selection distribution valves 28 and 29 to position a is applied to the converters 39 and 40 at the step 108C. In this way, the air temperature-controlled by the first temperature control unit 17a is supplied to the first air-conditioning zone Z1 and the third air-conditioning zone Z3, namely, the right seat air-conditioning zone, while the air temperature-controlled by the second temperature control unit 17b is supplied to the second and fourth air-conditioning zones Z2 and Z4 that is the left seat air-conditioning zone.

In this case, the temperature control abilities $T_R$ and $T_L$ of the first and second temperature control units 17a and 17b are computed in a manner to add or subtract a predetermined amount to or from the average required air supply temperature Ta making up a reference in a complementary manner. The amount to be added or subtracted is computed by multiplying the required air supply temperature difference $X_{RL}$ between the right and left seat air-conditioning zones by a predetermined value such as ¼. The computed values $T_R$ and $T_L$ representing the temperature control abilities of the temperature control units are converted into data $\theta_R$ and $\theta_L$ representing the opening of the temperature control dampers 14a and 14b respectively by a known functional equation at the step 108E. At the step 108F, the data $\theta_R$ and $\theta_L$ are applied to the converters 51a and 51b as control output signals thereby to determine the respective temperature control amounts.

At the routine B shown in FIG. 7, the processing similar to the routine A is performed for performing different temperature controls of the front and rear air-conditioning zones. At steps 109B and 109C, control outputs are applied to the converters 39 to 41 in such a manner as to move the distribution valves 30 and 31 to the intermediate position a and the distribution valves 28 and 29 to the position b. At the step 109D, the values $T_F'$ and $T_R'$ representing the temperature control abilities of the front and rear seat sections respectively are computed as complementary values, followed by the step 109E where these values are converted into $\theta_F'$ and $\theta_R'$ representing the openings of the temperature control dampers 14a and 14b respectively. At step 109F, the control outputs are applied to the converters 51a and 51b.

The routine A or B is selected at steps 106 and 107 in such a manner that the larger one of the temperature differences $X_{RL}$ and $X_{FR}$ is reduced.

To facilitate the understanding of the operation of the present system, assume that sunlight is radiated into the compartment diagonally from the front right side and that the temperature settings are the same for all the air-conditioning zones. Due to different heat effects of the sunlight on the air-conditioning zones, the respective air-conditioning zones have different required air supply temperatures Ta1 to Ta4 for regulating the actual temperatures Tr1 to Tr4 to the desired set temperatures. The sunlight under consideration is such that the temperature Ta1 required of the first air-conditioning zone Z1 of the compartment is lower than the temperature Ta2 required of the second air-conditioning zones Z2 or the temperatures required of the third and fourth air-conditioning zones, and the temperature Ta3 required of the third air conditioning zone is lower than that required of the fourth air-conditioning zone. In other words, the relation holds that Ta1<Ta2<Ta3<Ta4 or Ta1<Ta3<Ta2<Ta4.

If the former relation holds true, the value $|X_{RL}|-|X_{FR}|$ is negative and the routine B is selected so that the air supply temperature is regulated in such a manner as to reduce the actual temperature of the first and second air-conditioning zones below the actual temperature of the third and fourth air-conditioning zones, that is, in such a manner as to reduce the required temperature difference between the front and rear seat sections. With the resulting decrease in the actual temperature of the front seat section as compared with the temperature of the rear seat section, the required temperature difference between the right and left seats $X_{RL}$ takes a larger value than the required temperature difference $X_{FR}$ so that $|X_{RL}|-|X_{FR}|$ takes a positive value. As a result, the routine A is selected thereby to regulate the air supply temperature in a manner to reduce the actual temperature of the first and third air-conditioning zones below the actual temperature of the second and fourth air-conditioning zones. In this way, the temperatures of the air-conditioning zones of the compartment are regulated to approach to and maintain the desired set temperature in spite of the different effects of the external thermal load. Even if the direction of the sunlight and hence the set temperatures affecting the temperatures required of the air-conditioning zones change, the present system operates to control the selection of the air passages and temperature in a manner to satisfy the set temperatures.

The foregoing description concerns an embodiment of the present invention and the related art thereto. The present invention is not limited to such an embodiment but may take modifications as described below.

(1) The evaporator 13 arranged as a cooling unit at a part upstream of and common to the first and second temperature control units 17a and 17b contributes to the air-conditioning feeling as a dehumidified air is generated. Nevertheless, the primary feature of the system according to the present invention is to control the temperatures of a plurality of air-conditioning zones by use of the first and second temperature control units, and the object of the present invention for temperature control is attained without using such a cooling unit.

(2) Each of the first and second temperature control units may be provided with a separate cooling unit such as an evaporator so that the operation and shutdown of the evaporators may be combined as desired to control the characteristics of the air supplied to the air-conditioning zones in a multiple manner.

(3) In the first and second temperature control units, the water heaters 14a and 14b integrated with each other may be replaced with equal effect by a pair of independent water heaters connected in parallel by a piping.

(4) In the automatic control system, the temperature setters 45-1 to 45-4 may be replaced with equal effect by a single temperature setter for setting a common temperature. In this case, even when external heat of different magnitudes affect the air-conditioning zones, the system automatically controls the temperature of the air supplied to the respective air-conditioning zones to maintain the zones at a common set temperature as described above.

(5) In order to maintain the set temperature of each air-conditioning zone faithfully (accurately and rapidly) against the external heat effect, it is desirable to detect the magnitude of sunlight at each air-conditioning zone separately and to compute the air supply temperature required of each air-conditioning zone by use of the sunlight data separate for each air-conditioning zone.

(6) In the case where high faithfulness is not required, on the other hand, the sunlight sensor may be removed or the temperature sensors 44-1 to 44-4 may be mounted at places subject to small sunlight.

(7) The computer 50 may be such that the control program shown in FIG. 4 may be stopped under a specified condition. If a seat switch detects that all the seats are not occupied and the average compartment temperature is considerably different from the average set temperature, the distribution valves 28 to 31 may be moved to a fixed position to supply air only to the air-conditioning zones occupied by the passengers.

We claim:

1. An automobile air-condition system, comprising:
   (a) first and second temperature control units arranged in two divided parts of a single ventilation unit for supplying conditioned air to a compartment, each of said temperature control units including a heat exchanger for heating and means for adjusting the amount of heat exchange of said heat exchanger, said first temperature control unit and said second temperature control unit producing first air flow and second air flow respectively which are temperature controlled independently;
   (b) first air outlet communicated with a first air passage for supplying air to a first air-conditioning zone;
   (c) second air outlet communicated with a second air passage for supplying air to a second air-conditioning zone;
   (d) third air outlet communicated with a third air passage for supplying air to a third air-conditioning zone;
   (e) fourth air outlet communicated with a fourth air passage for supplying air to a fourth air-conditioning zone; and
   (f) selector means for connecting said first and second temperature control units to said first, second, third and fourth air outlets selectively, said selector means being movable between first and second positions, wherein in a first position of said selector means, said selector means conducts said first air flow to said first and second air outlets through said first and second air passages respectively, and conducts said second air flow to said third and fourth air outlets through said third and fourth air passages respectively, and in a second position of said selector means, said selector means conducts said first air flow to said first and third air outlets through said first and third passages respectively, and conducts said second air flow to said second and fourth air outlets through said second and fourth air passages respectively.

2. An automobile air-conditioning system according to claim 1, wherein said selector means comprises a first subpassage for branching off from said first air flow which goes to said first air passage, a first distribution valve for coupling said first subpassage to any one of said second and third air passages selectively, a second subpassage for branching off fromm said second air flow which goes to said second air passage, and a second distribution valve for coupling said second subpassage to any one of said second and third air passage selectively.

3. A system according to claim 2, wherein said selector means includes at least two switching means disposed at a junction of said first air passage and said first subpassage, and at a junction of said fourth air passage and said second subpassage respectively, each of said switching means selecting at least three positions including two positions where one of said air passage is opened and the other is closed and vice versa, and a position where both the air passages are semiopened.

4. A system according to claim 3, wherein each of said temperature control units includes a temperature control damper for changing the distribution ratio of the air passing through each of said heat exchangers and the bypass thereof as a means for adjusting the amount of heat exchange.

5. An automobile air-conditioning system comprising:
   (a) first and second temperature control units arranged in two divided parts of a single ventilation unit for supplying conditioned air to a compartment, each of said temperature control units including a heat exchanger for heating and means for adjusting the amount of heat exchange of said heat exchanger, said first temperature control unit and said second temperature control unit producing first air flow and second air flow respectively which are temperature controlled independently;
   (b) first air outlet communicated with a first air passage for supplying air to a first air-conditioning zone;
   (c) second air outlet communicated with a second air passage for supplying air to a second air-conditioning zone;
   (d) third outlet communicated with a third air passage for supplying air to a third air-conditioning zone;

(e) fourth air outlet communicated with a fourth air passage for supplying air to a fourth air-conditioning zone; and (f) selector means for connecting said first and second temperature control units to said first, second, third and fourth air outlets selectively, said selector means being movable between first and second positions, wherein in a first position of said selector means, said selector means conducts said first air flow to said first and second air outlets through said first and second air passages respectively, and conducts said second air flow to said third and fourth air outlets through said third and fourth air passages respectively, and in a second position of said selector means, said selector means conducts said first air flow to said first and third air outlets through said first and third passages respectively, and conducts said second air flow to said second and fourth air outlets through said second and fourth air passages respectively;

(g) a plurality of temperature sensors for detecting the actual temperature of each of said air-conditioning zones;

(h) electrical control means for computing a first temperature difference between the average temperature of said first and second air-conditioning zones and the average temperature of said third and fourth air-conditioning zones and a second temperature difference between the average temperature of said first and third air-conditioning zones and the average temperature of said second and fourth air-conditioning zones in response to the detection signals produced from said temperature sensors, said electrical control means comparing said first and second temperature differences with each other, said electrical control means producing a first output signal representing the result of said comparison and a second output signal corresponding to the larger one of said first and second temperature differences; and (i) an electro-mechanical converter for causing said selector means to select one of said first and second pairs in response to said first output signal of said electrical control means, said electro-mechanical converter causing said first and second temperature control units to change the amount of heat exchange in complementary manner in response to said second output signal.

6. A system according to claim 5, wherein said complementary change of the amount of heat exchange by said electrical control means and said electro-mechanical converter is effected around a reference value based on the average temperature of said four air conditioning zones.

7. A system according to claim 6, wherein each of said first and second temperature control units includes a temperature control damper for changing the distribution ratio of air passing through each of said heat exchangers and the bypass thereof as a means of adjusting the amount of heat exchange.

* * * * *